2,443,155

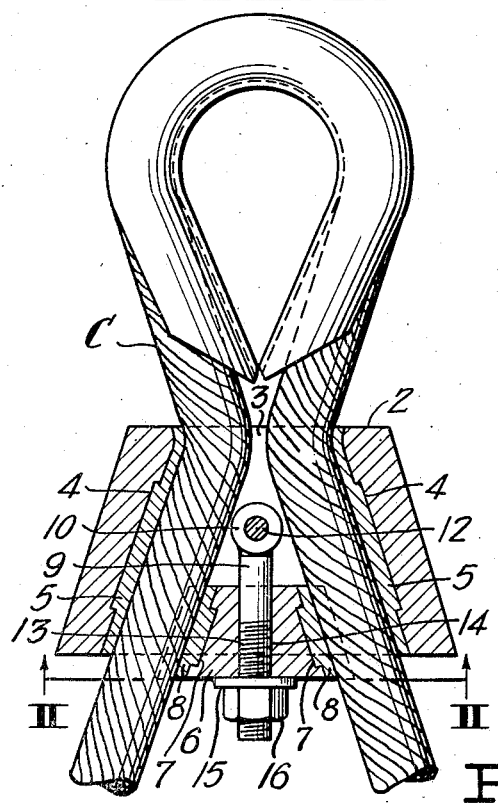
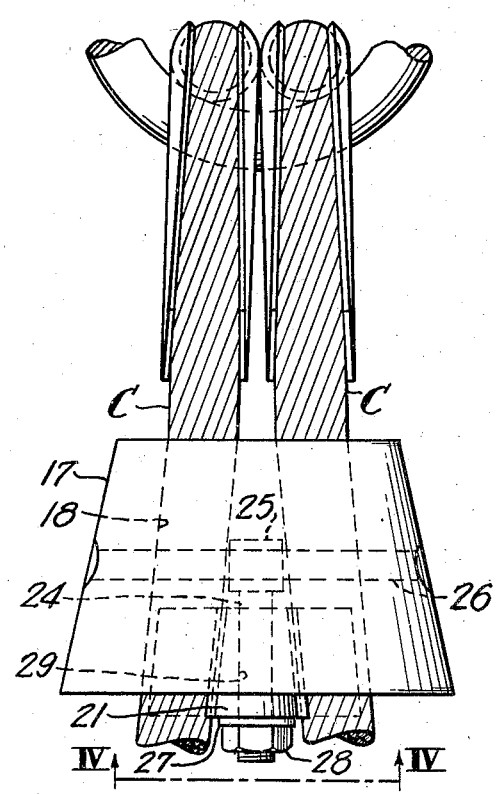
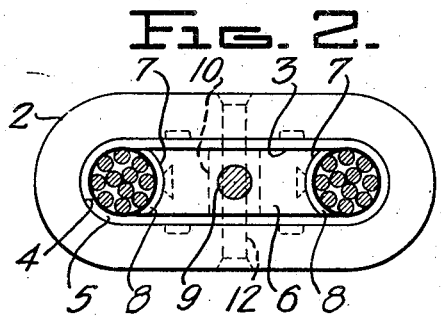
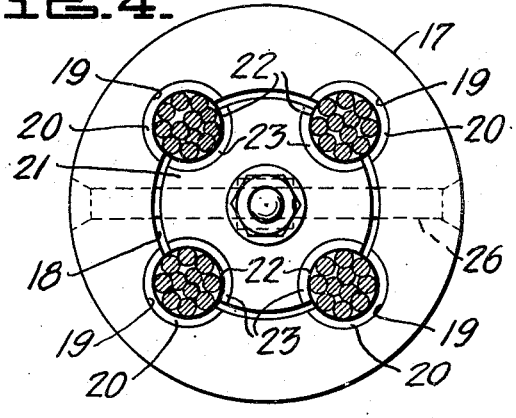
INVENTOR:
WALTER A. ZAHUTNIK,
BY: John E. Jackson
ATTORNEY Patented June 8, 1948

UNITED STATES PATENT OFFICE 2,443,155

CABLE CLAMP

Walter A. Zahutnik, Gary, Ind., assignor to Carnegie-Illinois Steel Corporation

Application December 8, 1943, Serial No. 513,403

4 Claims. (Cl. 24—136)

This invention relates to clamps, and particularly to an improved clamp for wire rope cables and the like.

It is the general object of the present invention to provide an improved clamp for cables and the like having means for gripping firmly portions of the cables to be clamped with provision for preventing abrasion of the strands of the wire cables while being clamped so that slippage of the clamped cable portions relative to the clamp is eliminated whereby increased life of the cables is obtained.

It is another object of the invention to provide an improved clamp for cables and the like which is simple and inexpensive in its construction and, at the same time, a clamp which is efficient and effective in its use.

It is a further object of this invention to provide an improved clamp for cables and the like which consists of a minimum number of parts, having means for adjusting the gripping or clamping force thereof upon the cable portions.

Various other objects and advantages of this invention will be more apparent in the course of the following specification and will be particularly pointed out in the appended claims.

In the accompanying drawings there is shown, for the purpose of illustration, one embodiment and a modification thereof, which my invention may assume in practice.

In the drawings:

Figure 1 is a longitudinal sectional view through the improved clamp of my invention showing a cable clamped therein;

Figure 2 is a sectional view taken on line II—II of Figure 1;

Figure 3 is a side elevational view of a modified form of clamp of my invention, showing a plurality of cables clamped therein; and Figure 4 is a sectional view taken on line IV—IV of Figure 3.

Referring more particularly to the drawings, the improved clamp of my invention, as shown in Figures 1 and 2, comprises a body member 2 having a wedge-shaped opening 3 arranged therethrough and extending longitudinally thereof so as to provide opposed angularly arranged or converging side walls 4 in the opening. The wall of the opening 3 is lined preferably with a plastic metallic material, such as lead, babbitt, or the like as at 5.

There is arranged in the larger end of the opening 3 of the body member 2 centrally and axially thereof, a wedge-shaped member 6 having sides or edges 7 which conform to the angularity of the sides 4 of the opening 3 and which are spaced therefrom so as to provide a space on either side of the wedge between the same and the sides 4. There is arranged on each of the outer sides or edges 7 of the wedge 6, preferably a semi-cylindrical-shaped liner or insert member 8 similar to the liner 5. For most purposes and the best results, both the side walls 4 of the opening 3 and the sides or edges 7 of the wedge 6 are arranged preferably at an angle of approximately 30 degrees with the axis of the body member. Both the body member 2 and the wedge 6 are made preferably of high grade cast steel.

There is arranged axially of the opening 3 in the body member 2 and extending thereinto, an eye-bolt 9 with the eye portion 10 thereof preferably pivotally attached to a rivet or pin 12 arranged transversely through a hole in the body member. The threaded portion 13 of the eye-bolt 9 extends through a longitudinally extending hole 14 arranged centrally through the wedge member 6. There is arranged on the outer end of the threaded portion 13 of the eye-bolt 9 beyond the outer end of the wedge 6 preferably a washer 15 and a nut 16 for moving the wedge-shaped member relative to the body member so as to provide a clamping action in a manner hereinafter to be described.

The improved clamp of my invention is used and assembled on the cable or cables adapted to be clamped in the following manner. The clamp is usually applied adjacent the end of a cable C after the same has been looped about a member to which the cable is adapted to be attached, as shown in Figure 1 of the drawings. The cable C is first threaded through the opening 3 in the space on one side of the wedge 6 between the side thereof and the side wall of the opening. The cable is then looped around the member to which it is adapted to be connected and is then passed back through the opening 3 in the space on the opposite side of the wedge 6 so as to provide an assembly, as shown in Figure 1 of the drawings. The nut 16 is then tightened so as to move the wedge 6 into the opening 3 relative to the body member 2. Upon such movement of the wedge 6 and after the nut has been sufficiently tightened, it will be seen that the metallic linings 8 on the sides 7 of the wedge 6 will cooperate with the lining 5 on the sides 4 of the opening 3 so as to securely hold and clamp those portions of the cable disposed therebetween.

In Figures 3 and 4 of the drawings, there is shown a slight modification of the improved clamp of my invention. In this construction, there is provided a frusto-conical-shaped body member 17 having a frusto-conical-shaped opening 18 arranged therethrough and extending longitudinally thereof. There is arranged concentrically around the side walls or periphery of the opening 18, a plurality of semi-cylindrical shaped grooves 19, namely, four in the present instance. In each of the grooves 19, there is disposed a semi-cylindrical-shaped liner or insert member 20 made of a plastic material such as lead, babbitt, and the like, similar to the liners 8 in the preferred embodiment.

There is arranged in the larger end of the opening 18 in the body member 17, a frusto-conical wedge-shaped member 21 which is positioned axially of the opening 18 with the sides therefrom spaced therefrom, as shown in Figure 4. In the outer periphery of the wedge member 21, there is arranged a plurality of spaced apart semi-cylindrical grooves 22 similar in size and number to the grooves 19 in the body member 17 with one positioned directly opposite one of the grooves 19 in the body member so as to provide a plurality of concentrically arranged cylindrical-shaped spaces therebetween. In each of the semi-cylindrical grooves 22 of the wedge member 21, there is arranged a semi-cylindrical liner or insert 23 similar to the inserts or liners 20. There is arranged axially of the opening 18 in the body member 17 and extending thereinto, an eyebolt 24 with the eye portion 25 thereof as before, preferably pivotally connected to the body member by means of a transversely extending pin or rivet 26 arranged in a hole extending through the body member in a manner similar to that of the preferred embodiment. The threaded portion of the eyebolt 24 extends through an opening 29 arranged axially through the wedge 21, and there is arranged on the outer end of the threaded portion beyond the wedge 21, preferably a washer 27 and a nut 28.

This modified form of clamp is designed primarily for clamping, two or more ropes with the clamp usually applied adjacent the end of the cables after the same have been looped about a member, as shown in Figure 3 of the drawings, in a manner similar to the preferred form. In this latter construction, each of the cables is threaded through one of the cylindrical spaces formed by one of the semi-cylindrical grooves 19 in the side of the opening 18 and the respective semi-cylindrical groove 22 in the periphery of the wedge 21 and back through a similar space on the opposite side of the wedge 21. After the cables have been properly threaded through the clamp and the same has been positioned at the desired point on the cables, the nut 28 is tightened so as to force the wedge member 21 into the opening 18. Upon movement of the wedge 21 and after the nut 28 has been sufficiently tightened, it will be seen that the portions of each of the cables C positioned in the spaces between the wedge 21 and the sides of the openings 18 of the body member 17 will be securely gripped and clamped due to the cooperation of the liners 23 of the wedge 21 with the liners 20 carried by the body member 17.

As a result of my invention, it will be seen that there is provided a clamp which consists of the minimum number of inexpensive parts which can be easily and conveniently manufactured and assembled. Also, it will be seen that by providing liners for the gripping surfaces of the clamp, that the cables will be securely clamped and held firmly in position whereby any slippage of the cables relative to the clamp is eliminated. Furthermore, by making the liners for the gripping surfaces of the clamp of a relatively soft material, the strands of the cables will not be injured due to the clamping action, and consequently the cables will have a relatively long life.

While I have shown and described several embodiments of my invention, it will be understood that these embodiments are merely for the purpose of illustration and description and that various other forms may be devised within the scope of my invention, as defined in the appended claims.

I claim:

1. A clamp for cables and the like comprising a body member having an opening arranged longitudinally therethrough with said opening having angularly arranged side walls, a wedge-shaped member having side portions conforming to the angularity of the sides of said opening positioned in the larger end thereof axially of said opening so as to provide a space on either side of said wedge with the cable adapted to be threaded through the opening in the spaces on either side of the wedge member in which portions of the cable to be clamped are adapted to be disposed, an eyebolt connecting said wedge member adjustably to said body member, said eyebolt arranged axially of the opening through said body member and extending thereinto, a pin arranged transversely of said body member and extending through the eye portion of said eyebolt so as to connect the same pivotally to said body member with the threaded portion of said eyebolt extending through an opening arranged centrally through said wedge member, and a nut arranged on the threaded portion of said eyebolt at the outer end thereof beyond said wedge member, said nut upon the tightening thereof adapted to force the wedge member inwardly of the opening into said body member so as to force the cable portions of the cable disposed within the body member against the side walls of the opening therein and adapted to cooperate therewith to securely hold and clamp the cable portions therebetween.

2. A clamp for cables and the like, as defined in claim 1, including a facing of plastic metallic material arranged both on those sides of the wedge member and the side walls of the opening through the body member which contact the portions of the cable during the clamping thereof.

3. A clamp for cables and the like comprising a body member having an opening arranged longitudinally therethrough through which the cable portions adapted to be clamped are threaded with the opening having angularly arranged side walls, a wedge-shaped member having side portions conforming to the angularity of the sides of said opening positioned in the larger end thereof axially of said opening, said wedge and said opening constructed and arranged so as to provide a plurality of spaces concentrically arranged between said wedge member and the inner sides of said opening in which the portions of the cable adapted to be clamped are disposed, and means connecting said wedge member adjustably to said body member whereby the wedge may be moved into and out of the opening relative to said body member, said means comprising a bolt extending into the opening through said body member and attached thereto with the threaded portion of the bolt extending axially through an opening in the wedge member, and a nut arranged on the outer end portion of said bolt beyond the wedge member for moving the same into the opening in said body member when the nut is tightened, said wedge member adapted to force the portions of the cable disposed in the spaces between the wedge against the sides of said opening and adapted to cooperate therewith to securely hold and clamp the cable portions therebetween.

4. A clamp for cables and the like comprising a body member having a frusto-conical-shaped opening arranged longitudinally therethrough through which the cable portions adapted to be clamped are threaded with the opening having angularly arranged side walls, a frusto-conical wedge-shaped member having side portions conforming to the angularity of the sides of said opening positioned in the larger end thereof axially of said opening, said body member having a plurality of semi-cylindrical-shaped grooves arranged concentrically around the periphery of said opening therein, said wedge-shaped member having a plurality of corresponding semi-cylindrical-shaped grooves arranged around the periphery thereof with one arranged directly opposite one of the grooves in said body member whereby a plurality of concentrically arranged spaces are provided between the wedge-shaped member and sides of said opening in which the portions of the cables adapted to be clamped are disposed, and means for positively moving said wedge-shaped member inwardly of said body member consisting of an eyebolt extending into the opening in the body member, a pin inserted through the eye portion thereof extending transversely of said body member with the threaded portion of the bolt extending axially through an opening in the wedge member, and a nut arranged on the outer threaded end portion of said bolt beyond the wedge-shaped member for moving the same into the opening in said body member when the nut is tightened, said wedge member when faced inwardly of said body member by said last-named means being adapted to force the portions of the cable disposed in the spaces between the wedge-shaped member against the sides of said opening and adapted to cooperate therewith to securely hold and clamp the cable portions therebetween.

WALTER A. ZAHUTNIK.

REFERENCES CITED

The following references are of record in the file of this patent:

UNITED STATES PATENTS

| Number | Name | Date |
| --- | --- | --- |
| 1,248,973 | Witherell | Dec. 4, 1917 |
| 1,248,991 | Barger | Dec. 4, 1917 |
| 1,644,376 | Haworth | Jan. 10, 1927 |

FOREIGN PATENTS

| Number | Country | Date |
| --- | --- | --- |
| 594,930 | France | July 6, 1925 |